June 6, 1939.  W. F. HARRISON ET AL  2,161,415
DISPENSER FOR PARCEL HANDLES
Filed July 28, 1937
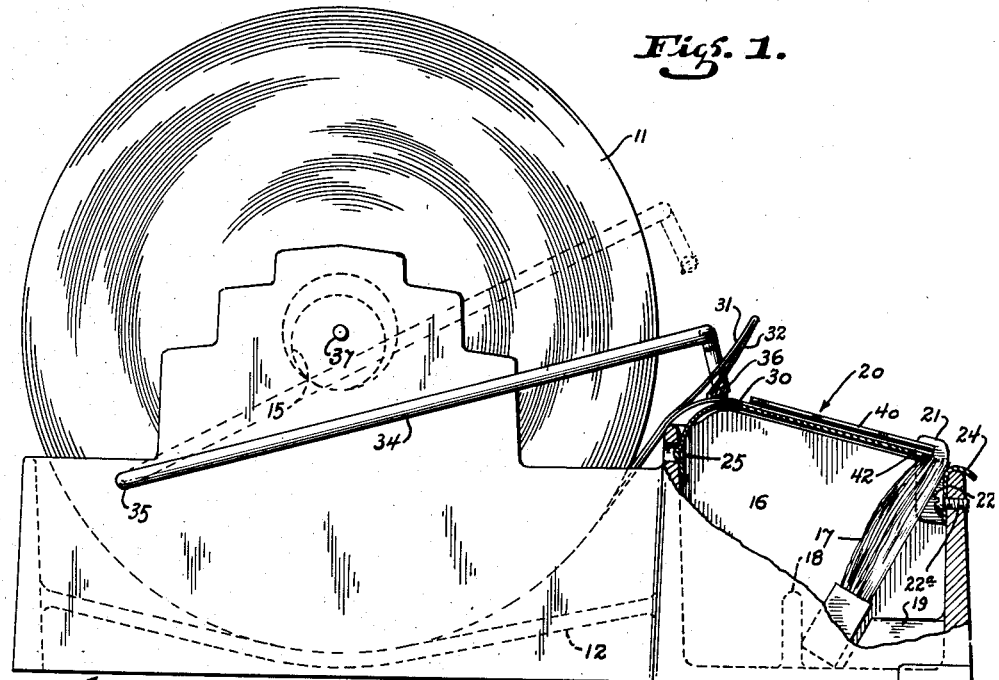
Fig. 1.
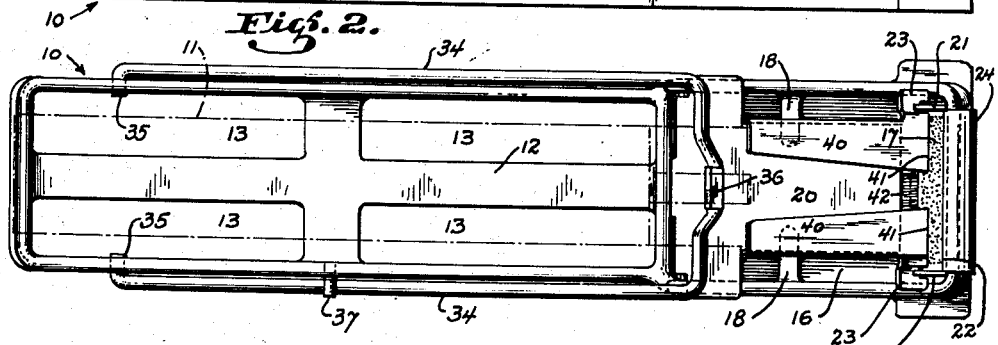
Fig. 2.
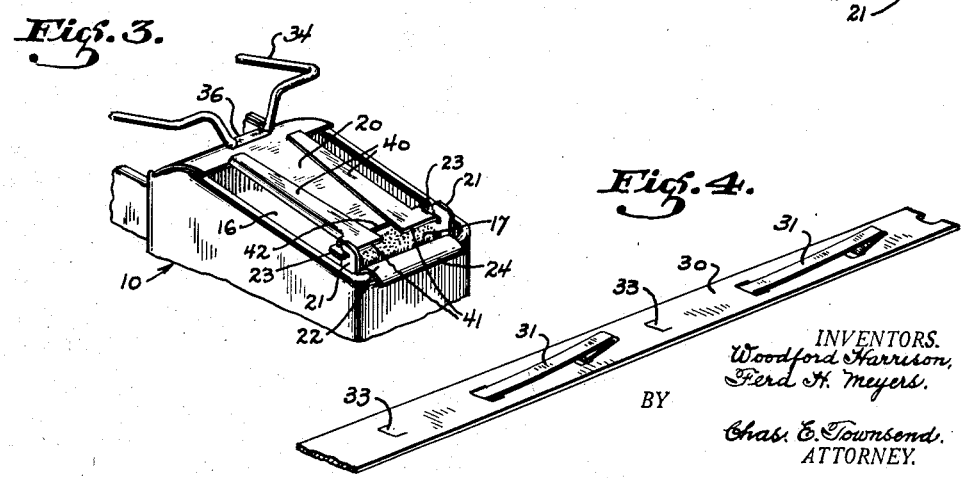
Fig. 3.
Fig. 4.
INVENTORS.
Woodford Harrison,
Ferd H. Meyers.
BY Chas. E. Townsend.
ATTORNEY.

Patented June 6, 1939

2,161,415

UNITED STATES PATENT OFFICE 2,161,415

DISPENSER FOR PARCEL HANDLES

Woodford F. Harrison, Berkeley, and Ferd H. Meyer, Oakland, Calif., assignors to The Adhesive Products Co., San Francisco, Calif., a corporation of California Application July 28, 1937, Serial No. 156,100

6 Claims. (Cl. 164—84.5)

This invention relates to dispensers for parcel handles, and particularly to a device for dispensing parcel handles formed of gummed paper. A typical handle of this kind is disclosed in a copending application of Woodford F. Harrison entitled "Parcel handle", filed April 7, 1937, Serial No. 135,495.

The parcel handles disclosed in said copending applications are manufactured in the form of a continuous strip of gummed paper having handle members or bails projecting from its ungummed surface at regular intervals so that the gummed paper may be torn into short lengths, each length including a bail member and being capable of application to a parcel by means of its gummed surface. Such continuous strips of handles may conveniently be packaged in rolls, and it is necessary, therefore, to unroll a length and tear it from the continuous strip in preparation to applying it as a handle to a parcel.

It is the object of the present invention to provide a dispensing device for parcel handles which will facilitate the removal of such handles one at a time from a continuous roll in properly measured lengths.

A further object of the invention is the provision of such a device in which the length of each handle torn from the roll will be controlled by the position of the bail members.

A further object is the provision of a guide and tearing means for separating handles from the rolls which will permit free passage of the bail members and yet insure complete and easy separation of each handle from the roll.

A further object is the provision in such a dispensing device of a wetting means for moistening the handle as it is withdrawn from the roll and for preventing contact between any moistened gummed surface and parts of the device to which it might adhere.

Further objects and advantages will appear in the following specification wherein one form of the invention is described in detail and wherein reference is made to the accompanying drawing which illustrates that form of the invention.

In the drawing—

Fig. 1 is a side elevation of the dispensing device embodying our invention, with parts shown in section to illustrate the details of construction thereof;

Fig. 2 is a plan view of the device illustrated in Fig. 1 with the supply roll removed;

Fig. 3 is a fragmentary perspective view showing a portion of the stop device and the guide and tearing mechanisms illustrated in Figs. 1 and 2; and Fig. 4 is a perspective view of a section of the type of material that the device is intended to dispense.

Referring to Figs. 1 and 2 of the drawing, the dispenser is illustrated as comprising an open top receptacle 10 for a supply roll 11 containing handles in a continuous strip. The bottom wall 12 of this receptacle is preferably inclined centrally 10 and may or may not be formed with large openings 13, as illustrated in Fig. 2. The supply roll 11 rests upon the bottom wall 12 in a central position due to the inclination of that wall, and it is desirable to insert a cylindrical metal weight, 15 such as indicated in dotted lines at 15 in Fig. 1, centrally of the supply roll to maintain it firmly within the receptacle, particularly when the size of the roll has been diminished.

Forwardly of the receptacle 10 is a water reservoir 16 which is formed between extensions of the walls which form the side walls of the receptacle 10. A brush 17 is held in an inclined position within the reservoir 16 by means of ribs 18 and 19 which may be cast integrally with the bottom wall of the reservoir so that the ends of its bristles contact and moisten the gummed surface of the handle members as they are withdrawn from the supply roll.

The reservoir is covered by a guiding and tearing member generally indicated at 20 which is removably retained in position at its forward end by means of vertically disposed notched ears 21 carried by a plate 22 and interlocking with horizontally disposed notched ears 23 carried by the member 20. Plate 22 is secured to the inner forward wall of the reservoir by a screw 22a, and is provided with a lip 24 which overhangs the upper edge of said wall. The rear end of the guide member is secured to the rear wall by a detent 25. This detent is formed on a downwardly turned resilient end of the guide member so that when the notched ears 21 and 23 are placed in engagement with each other, the rear end of the plate may be snapped into position, the detent serving to align it and retain it in its proper position.

In Fig. 4, the construction of the handles as they are withdrawn from the supply roll 11 is illustrated, the gummed tape being shown at 30 and the bail members at 31. These bail members are folded during the manufacture of the handles to lie substantially flat against the gummed tape as illustrated. In this position, a portion 32 of the bail member forms an acute angle with respect to the tape 30 and the apex of this angle is used as a stopping point as the tape is withdrawn from the roll, the stop being disposed to cause the tape to be torn on a line coincident with a centrally disposed cut 33 in the tape, one such cut being formed halfway between each of the bails 31. The stop member for performing this function is illustrated at 34 in Figs. 1 and 2 and comprises a bail-shaped wire pivoted to the casing at its ends as illustrated at 35. The cross member of the bail-shaped stop 34 is bent downwardly at its center and there shaped to provide a small blade 36 which, as the handles are withdrawn from the supply roll 11, will engage in the apex of the angle formed between the tape and bail member as illustrated in Fig. 1, thus preventing further withdrawal of the handles.

In order to withdraw a handle for use, the stop member 34 is moved or flipped upwardly with the finger, a pin 37 projecting from one side of the casing serving to limit the upward movement thereof. As the stop member falls down again, it rests on top of the bail member, rather than beneath it as illustrated in Fig. 1, so as to permit the withdrawal of the handle. The upwardly projecting portion of the bail member is then grasped and the tape is pulled through the guide member 20 which insures contact of the gummed surface of the tape with the wet brush 17. When a single handle has been withdrawn and when the cut 33 which determines the tearing point is in alignment with the tearing edge, the blade 36 of the stop member has come into engagement with the bail member of the next handle to insure that the tear which severs the handle from the roll is made at the proper point.

The details of construction of the guide member 20 and tearing edge thereof are best illustrated in Fig. 3. This guide member has upwardly and inwardly turned edges 40 which constrain the tape passing beneath and between them to a position insuring contact with the brush 17 as the tape is withdrawn from the dispenser. The space between the guiding edges 40 is sufficient to permit free passage of the bail members through the guide member. As the forward edges of the members 40 form a tearing edge 41 upon which the handles are separated from the supply roll, and as this tearing edge is interrupted by reason of the fact that the bail members must pass through it, it is apparent that a perfect tear could not ordinarily be made. However, with the cuts 33 formed in the tape and caused to stop in alignment with the tearing edge by reason of the engagement of the stop member with the bails, the interrupted tearing edge will suffice to produce a neat fraction of the tape at precisely the point desired. It is desirable that the cuts 33 be U-shaped, as illustrated in Fig. 4, rather than a simple straight slit across the tape, so that it is not necessary for the stop member to function with absolute accuracy. With the cuts 33 shaped as shown, the paper will be properly torn as long as any portion of the cut registers with the tearing edge 41.

The bottom plate of the guide member 20 is cut away short of the tearing edge 41 so that it terminates in an edge 42 which, as best seen in Figs. 1 and 3, is spaced from the bristles of the brush 17. This prevents any possibility of the gummed surface of the tape which has been wetted by the brush 17 coming into contact with the guide and sticking to the guide to make it gummy or to interfere with the free withdrawal of the handles. This feature of our invention is, of course, applicable to dispensers for gummed paper tapes whether or not they are provided with bail members. Another advantage in the construction of the guide member shown is that the main guide plate 20 and the supporting plate 22 are separable members. Consequently, the guide plate 20 may be removed and replaced without disturbing the wetting brush 17 and without necessitating insertion of said brush into the water reservoir through a small slot, as is the custom in other structures of this kind. Likewise, the bending up of the edges 40 to form the guide member provides a convenient space between the guide member and the top edges of the water reservoir so that it is possible to observe the water level in the reservoir and even add more water when required without removing or disturbing the guiding and wetting mechanism.

A further advantage of the construction shown which permits the handles to be withdrawn by grasping the bail member rather than the tape itself is that it is impossible for the operator's fingers to come in contact with the gummed surface of the tape during the dispensing thereof which would cause an uncomfortable stickiness of the fingers and would be otherwise unsatisfactory.

Various modifications in the structure and arrangement of the several parts of the invention herein illustrated and described may be varied within the scope of the appended claims.

Having thus described our invention, what we claim and desire to secure by Letters Patent is—

1. In a dispenser for parcel handles or the like formed on a continuous tape, means for guiding the withdrawal of the tape past a tearing edge, and means on the dispenser engageable with the handles to stop the tape in a position predetermined with respect to the tearing edge.

2. In a dispenser for parcel handles comprising bail members projecting at regular intervals from a continuous strip of gummed tape, means for guiding the withdrawal of the tape from a source of supply, means for severing single handles from the tape, and stop means comprising a member engageable with a projecting bail to stop withdrawal of the tape in a position predetermined with respect to the severing means.

3. In a dispenser for parcel handles comprising bail members projecting at regular intervals from a continuous tape, means for guiding the withdrawal of the tape, and a stop member engageable with the bails to interrupt withdrawal of the tape at corresponding intervals.

4. In a dispenser for parcel handles comprising flexible bail members projecting at regular intervals from a continuous tape and folded against the tape to form an acute angle therewith, a stop member engaging in said angle to limit withdrawal of the tape to one handle length and comprising a pivoted member capable of being swung away from the bail member to permit further withdrawal.

5. In a dispenser for parcel handles formed of a continuous tape with bail members projecting therefrom at intervals and with cuts formed therein between the bail members to demark tear lines for separation of single handles from the tape, a guide member for withdrawal of the tape from a supply roll and having a slot for the passage of the bail members, and a tearing edge on said guide member interrupted by said slot, said slot being aligned with said cuts whereby the tape may be completely separated by the interrupted tearing edge.

6. In a dispenser for parcel handles formed of a continuous tape with bail members projecting therefrom at intervals and with cuts formed therein between the bail members to demark tear lines for separation of single handles from the tape, a guide member for withdrawal of the tape from a supply roll and having a slot for the passage of the bail members, a tearing edge on said guide member interrupted by said slot, said slot being aligned with said cuts whereby the tape may be completely separated by the interrupted tearing edge, and means for interrupting the withdrawal of the tape with said cuts disposed at the interruption in the tearing edge.

WOODFORD F. HARRISON.
FERD H. MEYER.